(12) United States Patent
Shimokawa et al.

(10) Patent No.: US 6,407,800 B1
(45) Date of Patent: Jun. 18, 2002

(54) FOCUS DETECTION UNIT AND OPTICAL MEASURING INSTRUMENT HAVING THE SAME

(75) Inventors: Seiji Shimokawa; Kenji Okabe; Taizo Nakamura, all of Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/512,772

(22) Filed: Feb. 25, 2000

(30) Foreign Application Priority Data

Mar. 2, 1999 (JP) ............................................ 11-054046

(51) Int. Cl.⁷ ...................... G03B 27/52; G02B 7/28; G02B 21/26
(52) U.S. Cl. ...................... 355/55; 250/201.3; 359/365
(58) Field of Search .......................... 355/55, 60, 61, 355/62, 63, 53; 250/201.3, 548; 356/122, 609, 624, 400, 401; 359/385, 386, 387, 388, 389, 390, 368, 383

(56) References Cited

U.S. PATENT DOCUMENTS

| | | | |
|---|---|---|---|
| 3,871,764 A | * 3/1975 | Nishizawa | 355/18 |
| 5,315,349 A | * 5/1994 | Kamon | 355/125 |
| 5,475,490 A | * 12/1995 | Hirukawa et al. | 250/548 |
| 5,963,366 A | 10/1999 | Nakamura et al. | |
| 6,057,908 A | * 5/2000 | Ota | 250/548 |
| 6,088,113 A | * 7/2000 | Kim | 250/548 |

FOREIGN PATENT DOCUMENTS

JP 5-62882 * 3/1993

* cited by examiner

Primary Examiner—Alan A. Mathews
(74) Attorney, Agent, or Firm—Oliff & Berridge, PLC

(57) ABSTRACT

A focus detection unit being applicable to various workpiece and capable of reducing production cost and an optical measuring instrument having the focus detection unit are provided. The focus detection unit is for forming image of first focusing pattern and second focusing pattern onto an image surface of an optical system, projecting the image onto the workpiece, and adjusting relative position of the first focusing pattern and the second focusing pattern for focusing, the focus detection unit including: a slide plate having a plurality of pair of the first focusing pattern and the second focusing pattern; a switching member for switching the slide plate to project the image of either one of the first focusing patterns and the second pattern corresponding thereto onto the workpiece; and a projector for projecting the image of the focusing patterns switched by the switching member onto the workpiece.

16 Claims, 18 Drawing Sheets

IN-FOCUS

OUT-OF-FOCUS
(NEAR POINT FOCUSING)

OUT-OF-FOCUS
(FAR POINT FOCUSING)

IN-FOCUS

OUT-OF-FOCUS
(NEAR POINT FOCUSING)

OUT-OF-FOCUS
(FAR POINT FOCUSING)

P2B
P1B

W

IN-FOCUS

OUT-OF-FOCUS
(NEAR POINT FOCUSING)

OUT-OF-FOCUS
(FAR POINT FOCUSING)

IN-FOCUS

OUT-OF-FOCUS
(NEAR POINT FOCUSING)

OUT-OF-FOCUS
(FAR POINT FOCUSING)

IN-FOCUS

OUT-OF-FOCUS
(NEAR POINT FOCUSING)

OUT-OF-FOCUS
(FAR POINT FOCUSING)

IN-FOCUS

OUT-OF-FOCUS
(NEAR POINT FOCUSING)

OUT-OF-FOCUS
(FAR POINT FOCUSING)

IN-FOCUS

OUT-OF-FOCUS
(NEAR POINT FOCUSING)

OUT-OF-FOCUS
(FAR POINT FOCUSING)

IN-FOCUS

OUT-OF-FOCUS
(NEAR POINT FOCUSING)

OUT-OF-FOCUS
(FAR POINT FOCUSING)

IN-FOCUS

OUT-OF-FOCUS
(NEAR POINT FOCUSING)

OUT-OF-FOCUS
(FAR POINT FOCUSING)

IN-FOCUS

OUT-OF-FOCUS
(NEAR POINT FOCUSING)

OUT-OF-FOCUS
(FAR POINT FOCUSING)

IN-FOCUS

OUT-OF-FOCUS
(NEAR POINT FOCUSING)

OUT-OF-FOCUS
(FAR POINT FOCUSING)

IN-FOCUS

OUT-OF-FOCUS
(NEAR POINT FOCUSING)

OUT-OF-FOCUS
(FAR POINT FOCUSING)

FOCUS DETECTION UNIT AND OPTICAL MEASURING INSTRUMENT HAVING THE SAME

BACKGROUND OF THE INVENTION

1. Field of the Invention

The present invention relates to a focus detection unit and an optical measuring instrument having the focus detection unit. More specifically, it relates to a focus detection unit for forming image of first focusing pattern and second focusing pattern onto an image surface of an optical system and projecting the image onto a workpiece to be observed to adjust relative position of the first and the second focusing pattern for focusing and an optical measuring instrument having the focus detection unit.

2. Description of Related Art

In a field of optical measuring instrument such as microscope, linear image deviation alignment method using a split prism and image sandwiching method where a single sight line is sandwiched between a double sight line for focusing are known as focusing method.

In the former method, since the size of the split prism becomes large enough to cover the entire workpiece because of a complicated structure, vertical line of the target image shifts in right and left at the center in out-of-focus state, thus making focusing difficult.

In the latter method, since two optical systems are required, optical system becomes complicated and adjustment thereof can be troublesome.

In view of the above, the applicant has proposed a focus detection unit for solving the above problems (U.S. Pat. No. 5,963,366).

The focus detection unit is for focusing by forming images of double sight lines and an image of a single sight line on an image surface of an optical system of a microscope, projecting the images onto a workpiece, and adjusting the images such that the image of the single sight line is sandwiched by the images of the double sight lines, including: a first light source; a double slit mask provided on an optical axis of the first light source for forming the double slight lines; a single slit mask provided on an optical axis of the second light source for forming the single sight line; a second light source; a single slit mask provided on an optical axis of the second light source for forming the single sight line; a triangular-pole-shaped prism having a first side surface and a second side surface together constituting an edge of a predetermined angle and a plane opposing the edge for reflecting the double sight lines irradiating the first side surface and the single sight line irradiating the second side surface toward an area before the edge; and a projection lens provided before the edge of the prism for projecting the images of the double sight lines and the image of the single sight line onto the workpiece.

However, following disadvantage occurs in the above-described focus detection unit since the size of the pattern image remains constant relative to the predesignated observation magnification.

(1) When the double sight line image and the single sight line image are projected onto the measurement surface to be sandwiched thereon and the width of the line images coincide with the size of kerfs of the machine processing surface, it can be difficult to recognize the images because the width of the line images are fixed. For instance, in a workpiece having irregularities as shown in FIGS. (A) and (B), it can be difficult to adjust the gap of the slit images influenced by level difference when the irregularities coincide with the slit images.

(2) The magnification of the objective has to be changed for focusing to a microscopic part. Accordingly, when a measuring microscope has only one objective, the lens itself has to be exchanged, thus deteriorating workability.

(3) Since the illumination light source is disposed on two locations, in spite of small number of optical members, two lamps are required, thus increasing production cost.

SUMMARY OF THE INVENTION

An object of the present invention is to provide a focus detection unit capable of being used for measuring various workpiece while reducing production cost and an optical measuring instrument having the focus detection unit.

For achieving the object, the focus detection unit and the optical measuring instrument according to the present invention includes following arrangement.

The focus detection unit according to the present invention is for focusing by forming images of first focusing pattern and second focusing pattern onto image surface of an optical system, projecting the images onto a workpiece, and adjusting relative position of the first focusing pattern and the second focusing pattern, including: a focusing pattern forming member having a plurality of pair of the first focusing pattern and the second focusing pattern; a switching member for switching the focusing pattern forming member so that the images of either one of the focusing patterns and the second focusing pattern corresponding thereto on the focusing pattern forming member are projected onto the workpiece; and a projector for projecting the images of the focusing patterns switched by the switching member onto the workpiece.

According to the present invention, since the focusing pattern forming member has the plurality of the first and the second focusing pattern, which is switched by the switching member, the focus detection unit can be suitably used for various workpiece.

For instance, when a machined surface of the workpiece having irregularities is to be focused, easy focusing is possible by switching the focusing pattern that does not coincide with kerfs of the machined surface.

Further, when a microscopic portion is to be focused using a measuring microscope having only one objective, focusing without exchanging lens is possible by switching to a focusing pattern having different size.

In the focus detection unit according to the present invention, the first focusing pattern may preferably include first circular band pattern and the second focusing pattern may preferably include second focusing pattern concentric with the first circular band pattern and having different distance from a center of the first circular band pattern.

According to the above arrangement, since the focusing pattern has the circular band pattern, visibility of the focusing pattern can be improved even on a workpiece having directional property or roughness, thus enabling stable focusing. Especially, by watching change in width of the gap between the circular bands, accurate focusing irrespective of direction of the workpiece can be conducted.

In the focus detection unit according to the present invention, the first focusing pattern may preferably include first semi-circular band pattern and the second focusing pattern may preferably include second semi-circular band pattern line-symmetrical with the first semi-circular pattern.

The above "semi-circular band" shape refers to any shape where the first and the second focusing pattern forms a closed loop in in-focus state, such as semi-circular shape and reverse U-shape.

In the focus detection unit according to the present invention, the first focusing pattern may preferably include first lined triangle pattern having a plurality of lined triangle and the second focusing pattern may preferably include at least two second lined triangle patterns sandwiching the first lined triangle pattern.

Though any profile can be used for the triangle constituting the first and the second focusing pattern, a regular triangle and an isosceles triangle may preferably be used.

In the focus detection unit according to the present invention, the first focusing pattern may preferably include a large rhomboid pattern having a plurality of rhomboid section thereinside and the second focusing pattern may preferably include a plurality of small rhomboid pattern to be disposed in the rhomboid sections of the large rhomboid pattern.

The same effect as the aforesaid circular band pattern can be obtained by the above respective patterns.

In the focus detection unit according to the present invention, the first focusing pattern and the second focusing pattern may preferably be configured so that illuminated portions thereof coincide with each other in in-focus state, and the illuminated portions of both of the focusing patterns may preferably be illuminated by colors to be complementary with each other.

According to the above arrangement, the first focusing pattern and the second focusing pattern are illuminated by colors to be complementary, so that the color vanishes at portion where the patterns are superposed. Accordingly, focusing can be conducted by decoloring the patterns and the workpiece can be more easily observed since the color of the pattern image is lost at the in-focus position. Further, no extinguishing or exchanging work of the pattern is necessary, operability can be further improved.

In the focus detection unit according to the present invention, the projector may preferably include: a light source disposed on an optical axis; a first pair of mirror for reflecting luminous flux orthogonally irradiated by the light source toward the optical axis to irradiate onto either one of the first focusing patterns and the second focusing pattern corresponding thereto provided on the focusing pattern forming member; a second pair of mirror for reflecting the luminous flux transmitted through the focusing pattern forming member toward the optical axis; a prism disposed on the optical axis between the second pair of mirror for entering the luminous flux reflected by respective mirrors into a pair of slope; and a projection lens disposed in front of the prism.

According to the above arrangement, since the projector is constituted of the light source, two pairs of mirror, the prism and the projection lens, in other words, the projector has only a single light source, the production cost can be reduced as compared with the conventional arrangement of having two illumination light sources.

In the focus detection unit according to the present invention, the projector may preferably include: an optical fiber disposed on an optical axis; a first prism disposed on an end of the optical fiber; a first pair of mirror for reflecting luminous flux orthogonally reflected by the first prism toward the optical axis to irradiate onto either one of the first focusing patterns and the second focusing pattern corresponding thereto provided on the focusing pattern forming member; a second pair of mirror for reflecting the luminous flux transmitted through the focusing pattern forming member toward the optical axis; a second prism disposed on the optical axis between the second pair of mirror for entering the luminous flux reflected by respective mirrors into a pair of slope; and a projection lens disposed in front of the second prism.

According to the above arrangement, since the optical fiber and the prism are used instead of the light source of the aforesaid arrangement, thermal influence against the optical system can be reduced while obtaining the same effect as the aforesaid arrangement.

The optical measuring instrument according to another aspect of the present invention has the focus detection unit of the aforesaid respective arrangements and an objective for forming the image projected by the projector onto the workpiece.

According to the present invention, since the optical measuring instrument has the focus detection unit capable of switching the first and the second focusing patterns by the switching member, dimension of various workpiece can be accurately measured.

DETAILED DESCRIPTION OF PREFERRED EMBODIMENT(S)

An embodiment of the present invention will be described below with reference to attached drawings.

Figure 1:
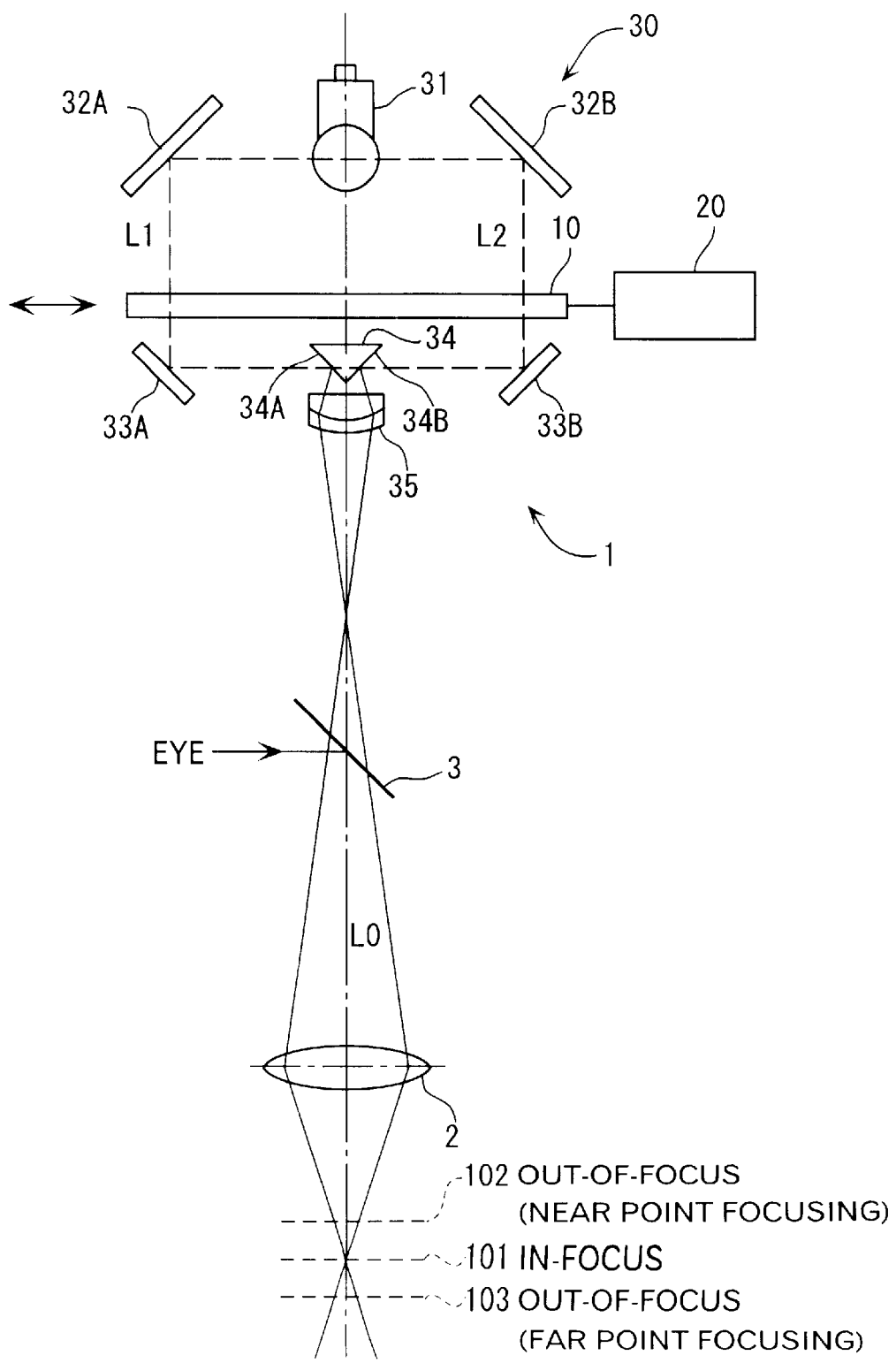
FIG. 1 is an illustration showing an embodiment of an optical measuring instrument having a focus detection unit according to the present invention.

FIG. 1 shows an optical measuring instrument according to the present embodiment. The optical measuring instrument is a microscope having a focus detection unit 1, an objective 2 for imaging an image projected by the focus detection unit 1 onto a workpiece, and a half-mirror 3 disposed between the objective 2 and the focus detection unit 1. The image half-reflected by the half-mirror 3 can be observed by eye through an eyepiece (not shown). Incidentally, the optical systems (the focus detection unit 1, the objective 2 and the half-mirror 3) are able to approach toward and separate from the workpiece (i.e., to move vertically relative to the workpiece).

The focus detection unit 1 has a slide plate 10 as a focusing pattern forming member having a plurality of pair of the first focusing pattern and the second focusing pattern, a switching member 20 for switching the slide plate to project either one of the first focusing patterns and the second focusing pattern corresponding to the first focusing pattern onto the workpiece to be observed, and a projector 30 for projecting the image of the focusing pattern switched by the switching member 20 onto the workpiece.

The projector has a lamp 31 as a light source disposed on an optical axis of the objective 2, a pair of mirror 32A and 32B for reflecting luminous flux irradiated in right and left direction from the lamp 31 (orthogonally with the optical axis L0) into directions L1 and L2 parallel to the optical axis L0 to irradiate onto either one of the first focusing patterns and the second focusing pattern corresponding thereto disposed on the slide plate 10, another pair of mirror 33A and 33B for reflecting the luminous flux transmitted through the slide plate 10 to the optical axis L0, a prism 34 disposed on the optical axis L0 between the pair of mirror 33A and 33B for entering the luminous flux reflected by respective mirrors 33A and 33B onto a pair of slope 34A and 34B forming a predetermined edge, and a projection lens 35 disposed in front of the prism 34.

Figure 2:
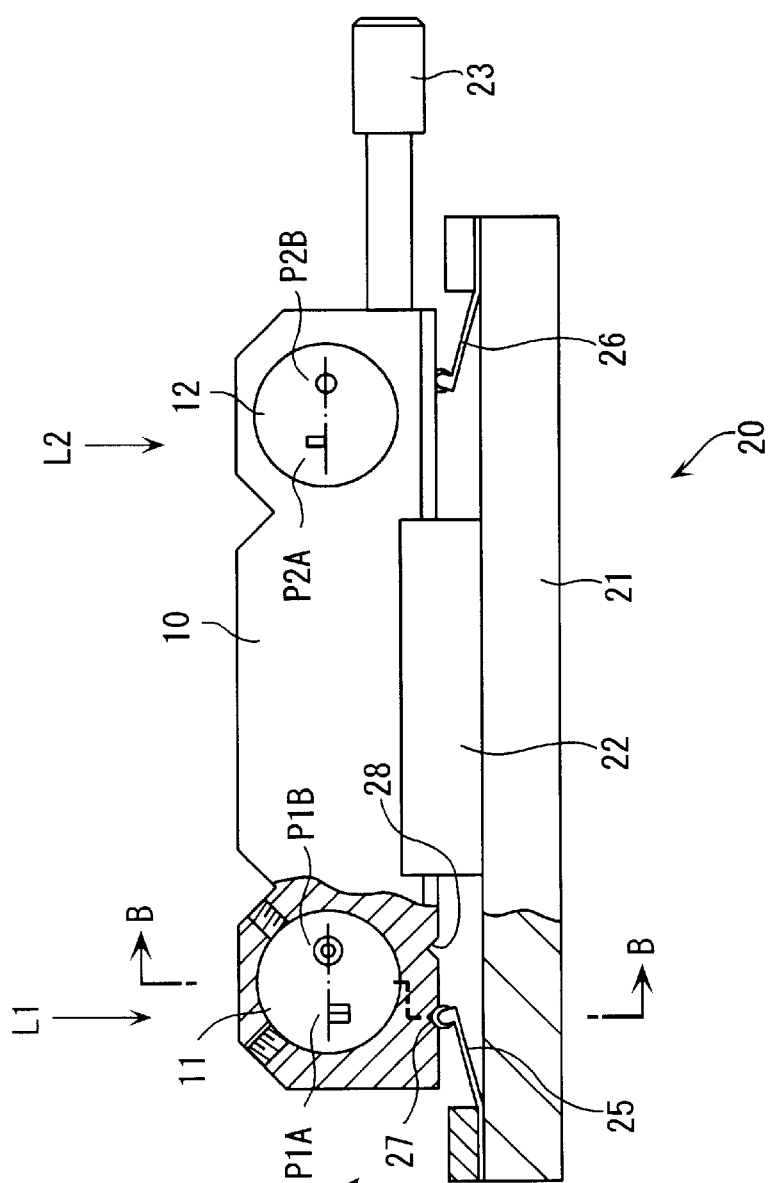
FIG. 2 is an illustration showing a slide plate and switching member of the aforesaid embodiment.
Figure 2:
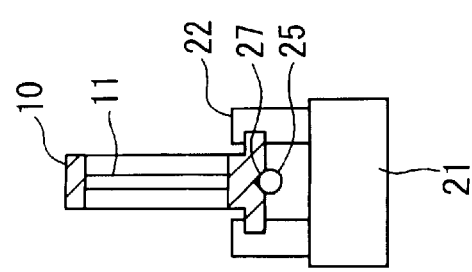

As shown in FIG. 2, the slide plate 10 has two pattern drawing members 11 and 12. Two focusing patterns P1A and P1B are drawn on the pattern-drawing member 11 with a predetermined gap therebetween in slide direction. Two focusing patterns P2A and P2B are drawn on the pattern-drawing member 12 with a predetermined gap therebetween in slide direction. In other words, a plurality of (two) pair of first focusing pattern P1A and P1B and second focusing pattern P2A and P2B corresponding thereto is provided on the pattern-drawing member 11 and 12.

Figure 3:
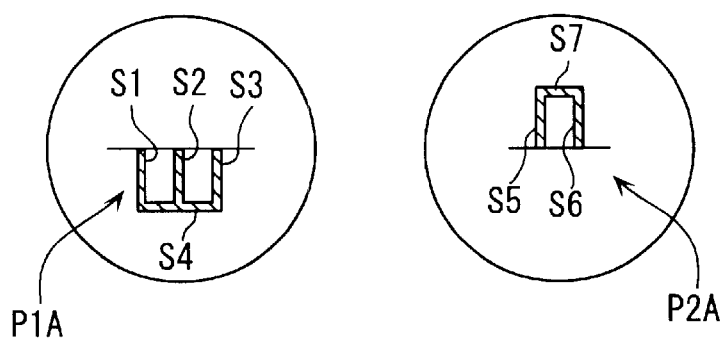
FIG. 3(A) and FIG. 3(B) are illustrations respectively showing first focusing pattern P1A and second focusing pattern P2A of the aforesaid embodiment.

The first focusing pattern P1A and the second focusing pattern P2A corresponding thereto have profiles shown in FIGS. 3(A) and 3(B). Specifically, as shown in FIG. 3(A), the first focusing pattern P1A has "square w-shape" composed of three slits S1 to S3 parallel with each other under a horizontal separate line and a slit S4 connecting lower ends of the slits S1 to S3. The second focusing pattern P2A has "reverse U-shape" composed of two slits S5 and S6 parallel with each other above the horizontal separate line and a slit S7 connecting upper ends of the slits S5 and S6.

Figure 4:
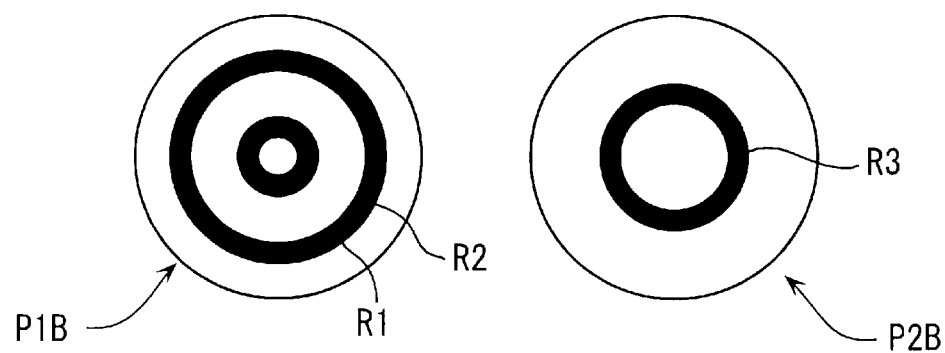
FIG. 4(A) and FIG. 4(B) are illustrations respectively showing first focusing pattern P1B and second focusing pattern P2B of the aforesaid embodiment.

The first focusing pattern P1B and the second focusing pattern P2B corresponding thereto have profiles shown in FIGS. 4(A) and 4(B). Specifically, as shown in FIG. 4(A), the first focusing pattern P1A has two concentric circular band patterns R1 and R2 having different radius r1 and r2. The second focusing pattern P2B has one circular band pattern R3 being concentric with the circular band patterns R1 and R2 and having radius r3 different from the radii r1 and r2 of the circular band patterns R1 and R2 (r1<r3<r2), the width of the circular band pattern R3 being arranged so that a predetermined gap can be secured therebetween (between R1 and R2, and between R2 and R3)

As shown in FIG. 2, the switching member 20 includes a base 21, a holder 22 for holding the slide plate 10 reciprocatively relative to the base 21, a switching knob 23 projecting from the slide plate 10 in a slide direction thereof, and a positioning device 24 for positioning the slide plate 10 so that either one of the first focusing pattern is located on the optical axis L1 and the second focusing pattern corresponding to the first focusing pattern is located on the optical axis L2 when the slide plate 10 is slid by the switching knob 23. The positioning device 24 is composed of plate springs 25 and 26 disposed on both sides of the base 21 and having a roller at an end thereof, and two V-shaped grooves 27 and 28 formed on lower surface of the slide plate 10.

Figure 5:
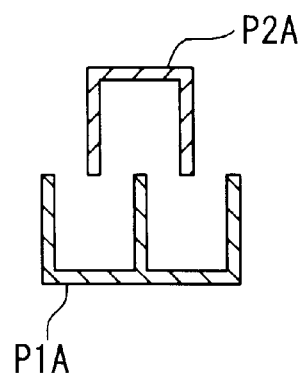
FIG. 5(A) to FIG. 5(C) are illustrations showing transition of the first focusing pattern P1A and the second focusing pattern P2A in the aforesaid embodiment, FIG. 5(A) showing in-focus state, FIG. 5(B) showing out-of-focus state (near point focusing) and FIG. 5(C) showing out-of-focus state (far point focusing)
Figure 5:
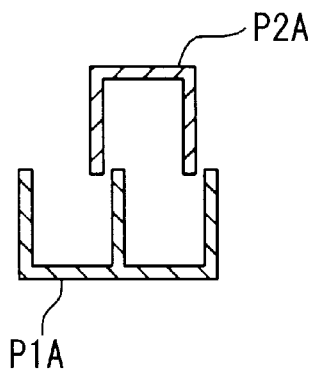
Figure 5:
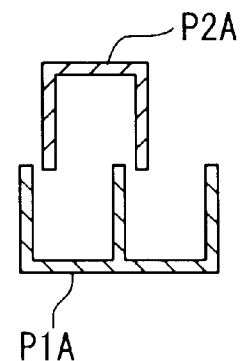

In the above arrangement, the first focusing pattern P1A and the second focusing pattern P2A are located on the optical axes L1 and L2 by switching the switching member 20. When the microscope is focused on the workpiece, in other words, in in-focus state 101, the second focusing pattern P2A is located at the center of the first focusing pattern P1A as shown in FIG. 5(A).

On the other hand, when the workpiece is located before the focal point, i.e., out-of-focus state (near point focusing) 102 and when the workpiece is located after the focal point, i.e., out-of-focus state (far point focusing) 103, the second focusing pattern P2A is biased to either side relative to the center of the first focusing pattern P1A. In this case, the optical systems (the focus detection unit 1, the objective 2 and the half-mirror 3) are adjusted while being vertically moved relative to the workpiece so that the second focusing pattern P2A is located at the center of the first focusing pattern P1A.

Figure 6:
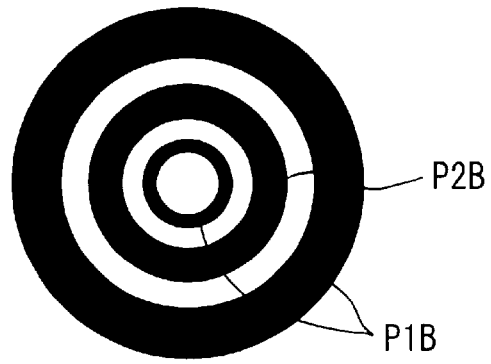
FIG. 6(A) to FIG. 6(C) are illustrations showing transition of the first focusing pattern P1B and the second focusing pattern P2B in the aforesaid embodiment, FIG. 6(A) showing in-focus state, FIG. 6(B) showing out-of-focus state (near point focusing) and FIG. 6(C) showing out-of-focus state (far point focusing)
Figure 6:
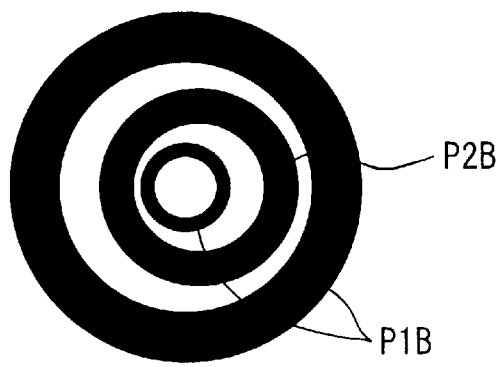
Figure 6:
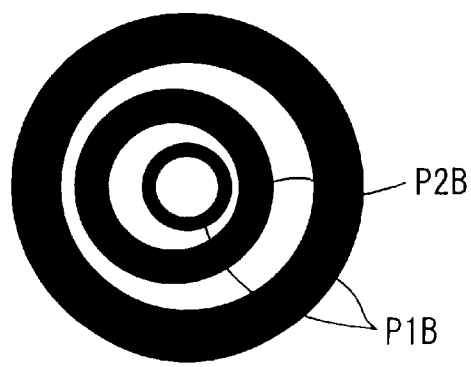

When the optical systems (the focus detection unit 1, the objective 2 and the half-mirror 3) are vertically moved relative to the workpiece with the first focusing pattern P1B and the second focusing pattern P2B located on the optical axes L1 and L2 by switching operation by the switching member 20, the focusing pattern changes as shown in FIGS. 6(A), (B) and (C).

In other words, at in-focus state 101, the gap between the first focusing pattern P1B and the second focusing pattern P2B are the same on the entire circumference as shown in FIG. 6(a). On the other hand, during out-of-focus state 102 (near point focusing) and 103 (far point focusing), there is difference in the gap between the first focusing pattern P1B and the second focusing pattern P2B as shown in FIGS. 6(B) and (C). Accordingly, the focusing operation is possible by watching the gap.

Figure 7:
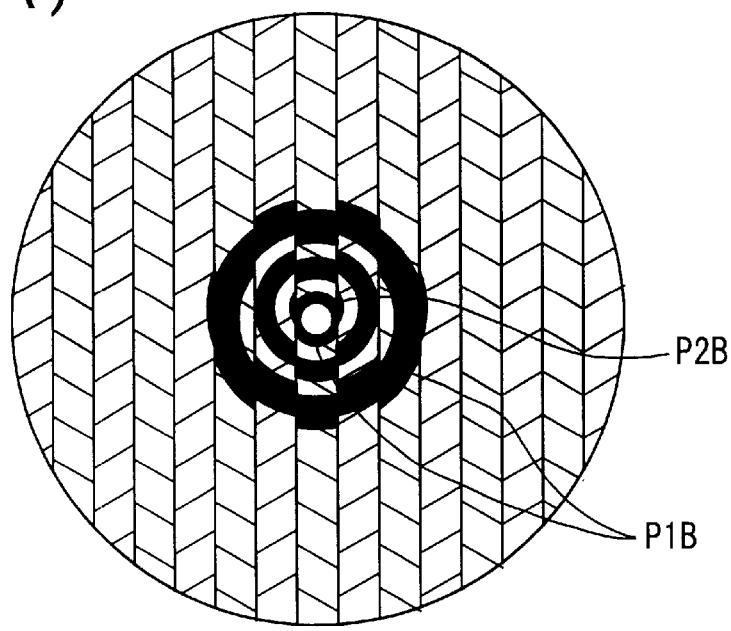
FIG. 7(A) and FIG. 7(B) are illustrations of the first focusing pattern P1B and the second focusing pattern P2B being projected onto a machine processing surface of a workpiece.
Figure 7:
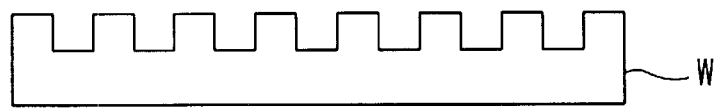

Especially, even when the measurement surface of the workpiece has irregularities because of kerfs of a machine, the irregularities on the machined surface and the direction of the focusing patterns P1B and P2B do not coincide with each other as shown in FIGS. 7(A) and (B), so that focusing is possible even in a machined workpiece.

According to the present embodiment, following effect can be obtained.

Since two pairs of first and second focusing pattern, i.e. the first focusing patterns P1A and P1B, and second focusing patterns P2A and P2B, are provided, which are switched to be located on the optical axes L1 and L2 by the switching member 20, the focus detection unit can be suitably used for various workpiece.

For instance, in focusing on a machined surface of a workpiece, even when the workpiece has irregularities thereon, easy and accurate focusing is possible by switching to the focusing pattern that does not coincide with kerfs of the machined surface. Further, when a microscopic portion is to be focused using a measuring microscope with only one objective, focusing operation is possible without exchanging the lens by switching to a focusing pattern having different size.

Further, since the first focusing pattern has circular band patterns R1 and R2 and the second focusing pattern has a circular band pattern R3 concentric with the circular band patterns R1 and R2 and having different distance from a center thereof, visibility of the focusing pattern for a workpiece having directional property and/or roughness can be improved, thus achieving secure focusing. Especially, accurate focusing is possible irrespective of direction of the workpiece by watching change in gap of the circular band.

Further, since the projector 30 has the lamp 31, the pair of mirror 32A and 32B for reflecting luminous flux irradiated right and left from the lamp 31 in a direction parallel to the optical axis L0 to irradiate either one of the first focusing patterns and the second focusing pattern corresponding thereto drawn on the slide plate 10, another pair of mirror 33A and 33B for reflecting the luminous flux transmitted through the slide plate 10 toward the optical axis L0, the prism 34 disposed on the optical axis between the pair of mirror 33A and 33B for reflecting the luminous flux reflected by respective mirrors 33A and 33B to the pair of slope 34A and 34B, and the projection lens 35 disposed in front of the prism 34, in other words, includes a single lamp 31, production cost can be reduced as compared to conventional arrangement having two illumination light source.

Since the switching member 20 is composed of: the base 21; the holder 22 for reciprocatingly holding the slide plate 10 relative to the base 21; the switching knob 23 projecting from the slide plate 10; and the positioning device 24 for positioning the slide plate 10 so that either one of the first focusing patterns are located on the optical axis L1 and the second focusing pattern corresponding thereto is located on the optical axis L2 when the slide plate 10 is slid by the switching knob 23, the slide plate 10 can be accurately located to a predetermined position. Further, since the positioning device 24 is composed of: the plate springs 25 and 26 provided on both sides of the base 22 and having the roller at an end thereof; and two V-shaped grooves 27 and 28 formed on lower surface of the slide plate 10, in other words, since the plate springs 25 and 26 press the slide plate 10, shaky movement of the holder 22 and the slide plate 10 can be reduced.

According to a microscope having the focus detection unit 1 and the objective 2 for imaging the image projected by the projector 30 of the focus detection unit 1 onto the workpiece, dimension of various workpiece can be accurately measured.

Figure 8:
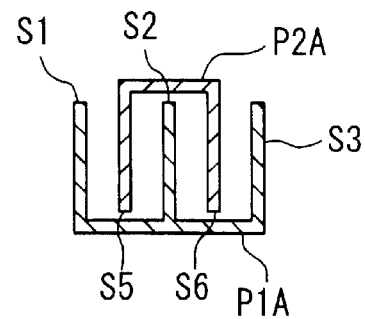
FIG. 8(A) to FIG. 8(C) are illustrations showing modification of the first focusing pattern P1A and the second focusing pattern P2A of the aforesaid embodiment, FIG. 8(A) showing in-focus state, FIG. 8(B) showing out-of-focus state (near point focusing) and FIG. 8(C) showing out-of-focus state (far point focusing)
Figure 8:
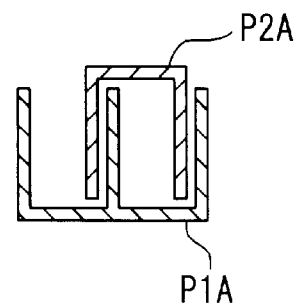
Figure 8:
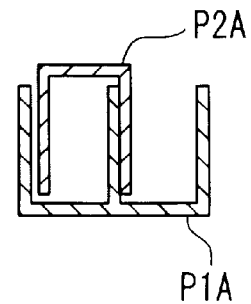

In the above-described embodiment, the first focusing pattern P1A and the second focusing pattern P2A may be arranged as shown in FIG. 8. Specifically, two slits S5 and S6 constituting the second focusing pattern P2A may be inserted between three slits S1 to S3 constituting the second focusing pattern P2A. Accordingly, interval between the slits S1 to S3 and the slits S5 and S6 can be visually checked more accurately.

The first and the second focusing pattern are not restricted to specific profile but may be semi-circular band pattern, lined triangle pattern, rhomboid pattern, linear pattern and differently-colored pattern.

Figure 9:
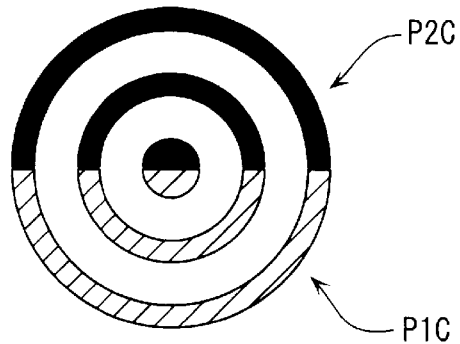
FIG. 9(A) to FIG. 9(C) are illustrations having half-ring first focusing pattern and second focusing pattern, FIG. 9(A) showing in-focus state, FIG. 9(B) showing out-of-focus state (near point focusing) and FIG. 9(C) showing out-of-focus state (far point focusing)
Figure 9:
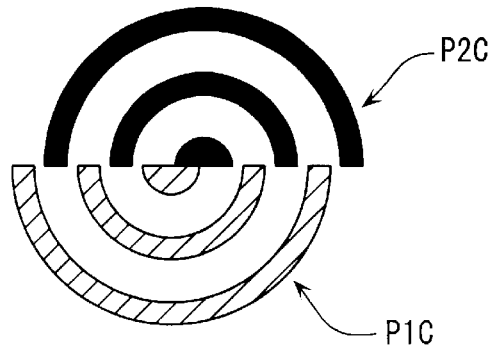
Figure 9:
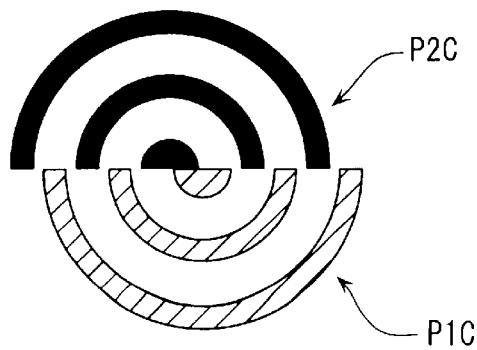

For instance, as shown in FIG. 9, the semi-circular band pattern may have first focusing pattern P1C (diagonal line portion) composed of concentric three semi-circular band patterns with different radius and second focusing pattern P2C (black portion) linearly symmetrical with the first focusing pattern P1C.

Figure 10:
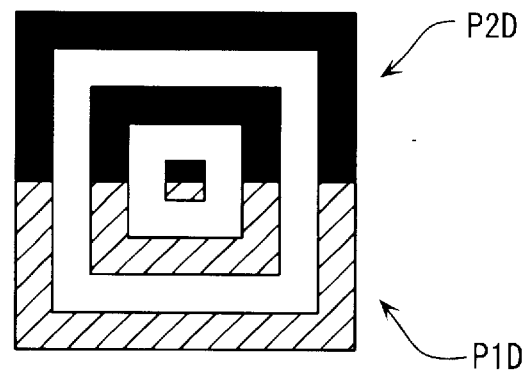
FIG. 10(A) to FIG. 10(C) are illustrations having half-rectangular first focusing pattern and second focusing pattern, FIG. 10(A) showing in-focus state, FIG. 10(B) showing out-of-focus state (near point focusing) and FIG. 10(C) showing out-of-focus state (far point focusing)
Figure 10:
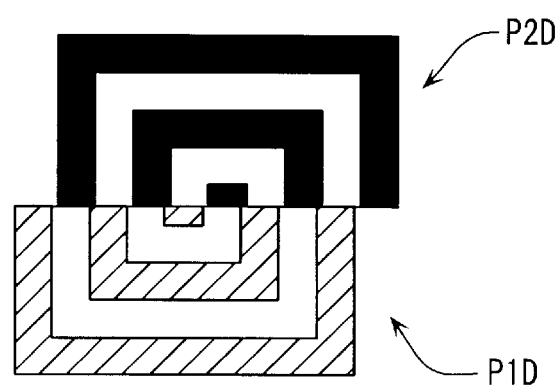
Figure 10:
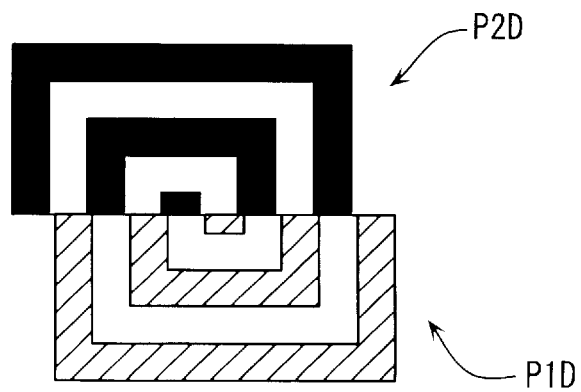

As shown in FIG. 10, the first focusing pattern P1C and the second focusing pattern P2C may be composed of half-rectangular first focusing pattern P1D (diagonal line portion) and second focusing pattern P2D (black portion).

Figure 11:
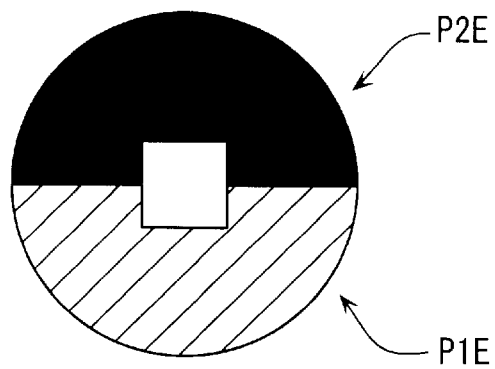
FIG. 11(A) to FIG. 11(C) are illustrations having semi-circular first focusing pattern and second focusing pattern having rectangular portion thereinside, FIG. 11(A) showing in-focus state, FIG. 11(B) showing out-of-focus state (near point focusing) and FIG. 11(C) showing out-of-focus state (far point focusing)
Figure 11:
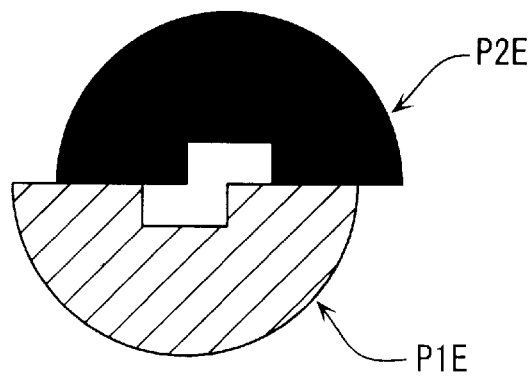
Figure 11:
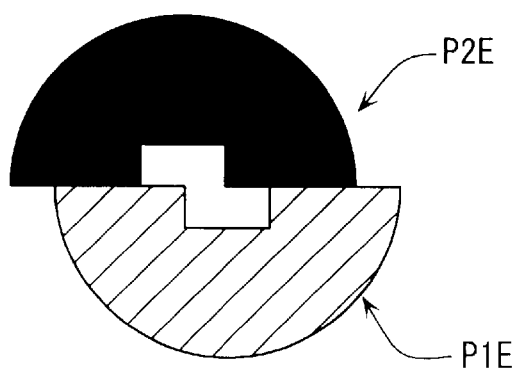

As shown in FIG. 11, the first focusing pattern P1E (diagonal line portion) having a semi-circular pattern and the second focusing pattern P2E (black portion) may be employed so that the image in in-focus state becomes circle having a rectangle thereinside.

Figure 12:
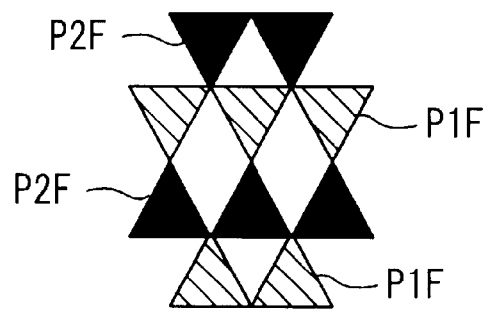
FIG. 12(A) to FIG. 12(C) are illustrations having lined triangle first focusing pattern and second focusing pattern where a plurality of triangle is aligned, FIG. 12(A) showing in-focus state, FIG. 12(B) showing out-of-focus state (near point focusing) and FIG. 12(C) showing out-of-focus state (far point focusing)
Figure 12:
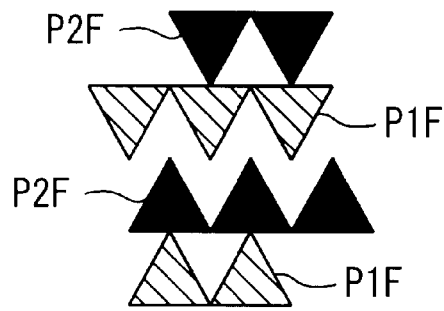
Figure 12:
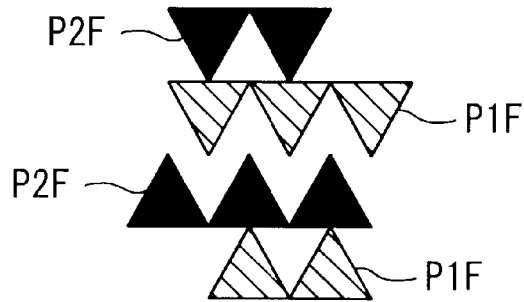

The first focusing pattern (diagonal line portion) P1F including two lined triangle patterns having a plurality of triangle and the second focusing pattern P2F (black portion) having two lined triangle patterns sandwiching the lined triangle pattern may be used as shown in FIG. 12. In this case, though any profile can be used for triangles constituting the first and the second focusing pattern, regular triangle and isosceles triangle may preferably be used.

Figure 13:
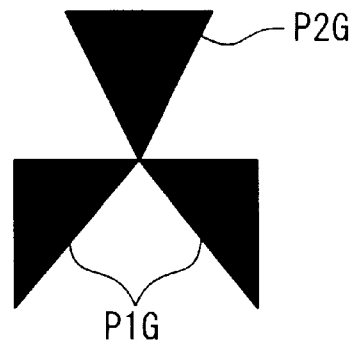
FIG. 13(A) to FIG. 13(C) are illustrations having first focusing pattern and second focusing pattern composed of three triangles, FIG. 13(A) showing in-focus state, FIG. 13(B) showing out-of-focus state (near point focusing) and FIG. 13(C) showing out-of-focus state (far point focusing)
Figure 13:
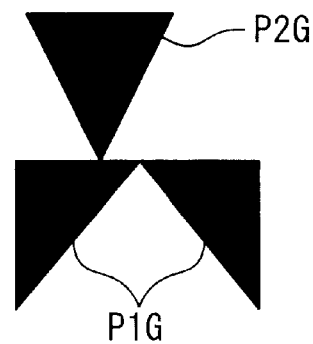
Figure 13:
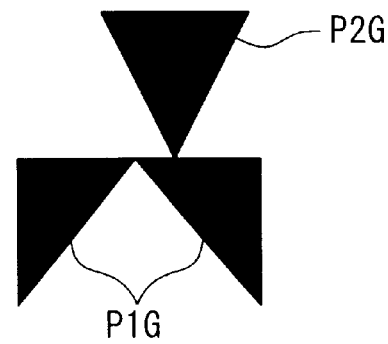

As shown in FIG. 13, first focusing pattern P1G having two triangle patterns adjacently disposed and second focusing pattern P2G composed of one triangle disposed at the center of the first focusing pattern P1G at in-focus state may also be used.

Figure 14:
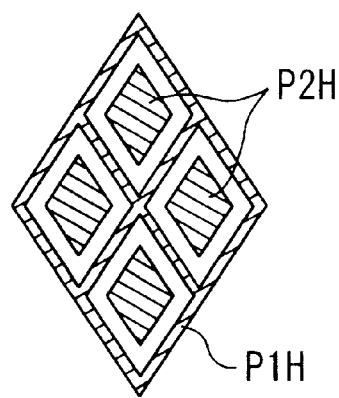
FIG. 14(A) to FIG. 14(C) are illustrations having rhomboid-shaped first focusing pattern and second focusing pattern, FIG. 14(A) showing in-focus state, FIG. 14(B) showing out-of-focus state (near point focusing) and FIG. 14(C) showing out-of-focus state (far point focusing)
Figure 14:
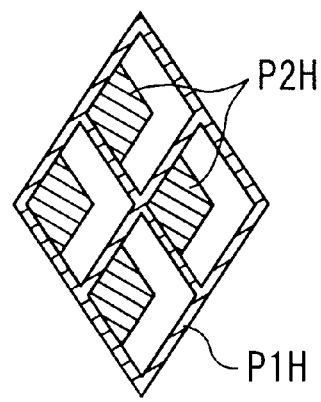
Figure 14:
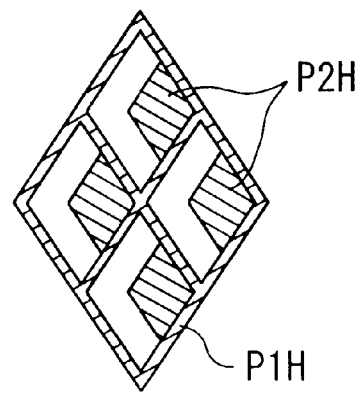

As shown in FIG. 14, first focusing pattern P1H composed of large rhomboid pattern having four rhomboid sections thereinside and second focusing pattern P2H composed of four small rhomboid patterns disposed in respective sections of the large rhomboid pattern with a small gap therebetween at in-focus state may also be used.

Figure 15:
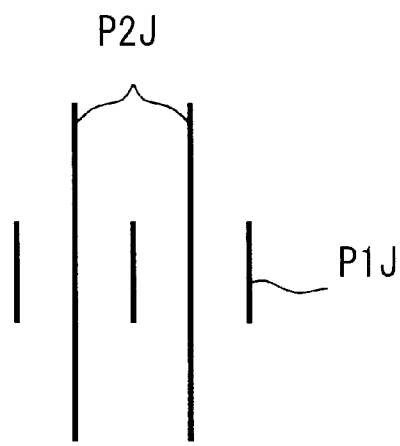
FIG. 15(A) to FIG. 15(C) are illustrations having linear first focusing pattern and second focusing pattern, FIG. 15(A) showing in-focus state, FIG. 15(B) showing out-of-focus state (near point focusing) and FIG. 15(C) showing out-of-focus state (far point focusing)
Figure 15:
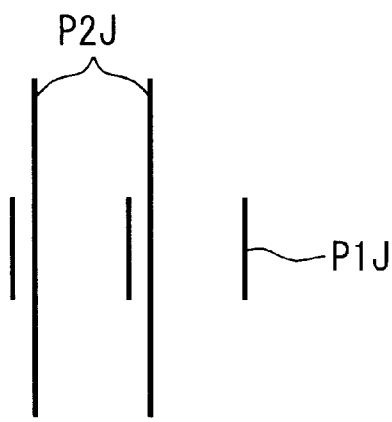
Figure 15:
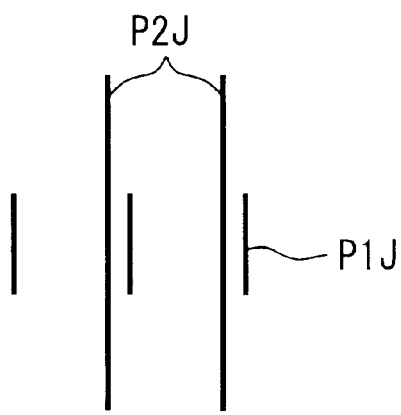

As shown in FIG. 15, first focusing pattern P1J composed of mutually parallel three short lines spaced apart with each other at a predetermined interval and second focusing pattern P2J composed of two long lines disposed at the center of the three short lines at in-focus state may also be used.

Figure 16:
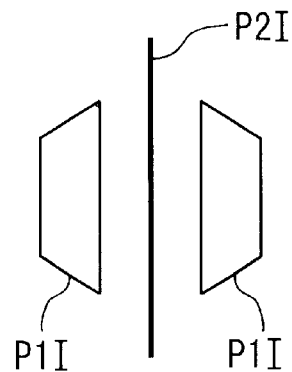
FIG. 16(A) to FIG. 16(C) are illustrations having first focusing pattern and second focusing pattern composed of trapezoid frame pattern and linear pattern, FIG. 16(A) showing in-focus state, FIG. 16(B) showing out-of-focus state (near point focusing) and FIG. 16(C) showing out-of-focus state (far point focusing)
Figure 16:
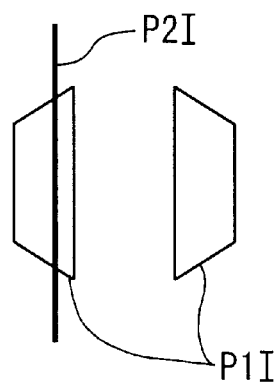
Figure 16:
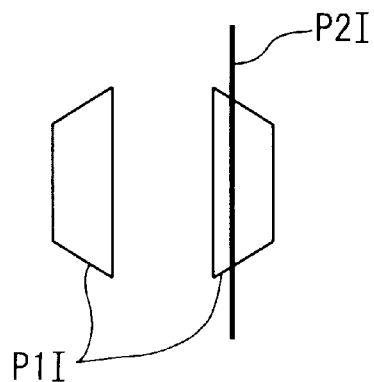

As shown in FIG. 16, first focusing pattern P1I composed of mutually parallel two rectangular frame lines spaced apart with each other at a predetermined interval and second focusing pattern P2I composed of one single line disposed at the center of the two rectangular frame lines of the first focusing pattern P1I at in-focus state may also be used.

Figure 17:
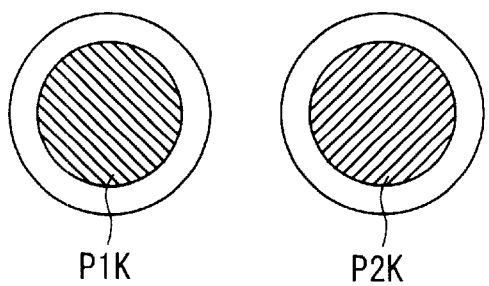
FIG. 17(A) to FIG. 17(C) are illustrations having first focusing pattern and second focusing pattern illuminated by lights mutually having complementary color, FIG. 17(A) showing respective patterns, FIG. 17(B) showing in-focus state, FIG. 17(C) showing out-of-focus state (near point focusing) and FIG. 17(D) showing out-of-focus state (far point focusing)
Figure 17:
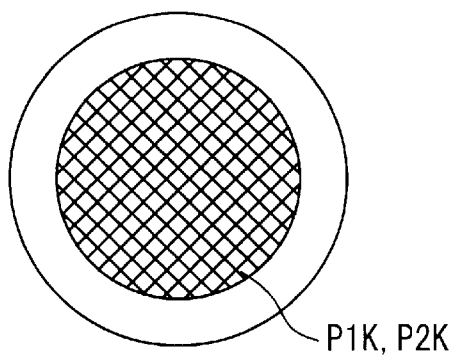
Figure 17:
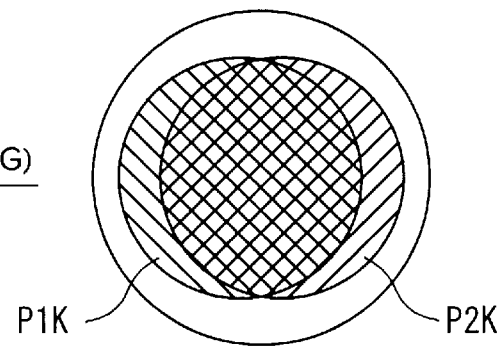
Figure 17:
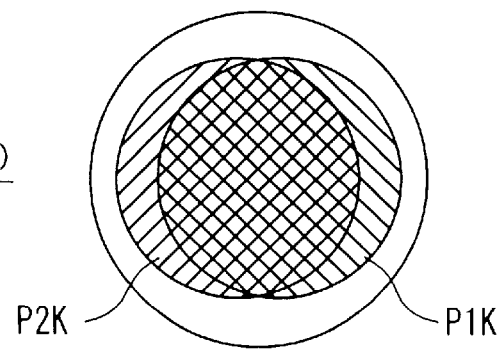

Alternatively, as shown in FIG. 17, first focusing pattern P1K and second focusing pattern P2K may be arranged to have an illuminated portion having profile (circle of the same size) to be consistent with each other at in-focus state and the illuminated portion of both focusing patterns may be illuminated by complementarily-colored light.

Accordingly, the color of the portions where both patterns are superposed vanishes. Accordingly, focusing is possible by decoloring the pattern and observation of the workpiece is facilitated since the color of the pattern image vanishes at a focused position. Further, since extinguishing or switching work of the pattern is not required, operability can be further improved.

The arrangement of the projector 30 is not restricted to the arrangement described in the aforesaid embodiment but other arrangement is possible.

Figure 18:
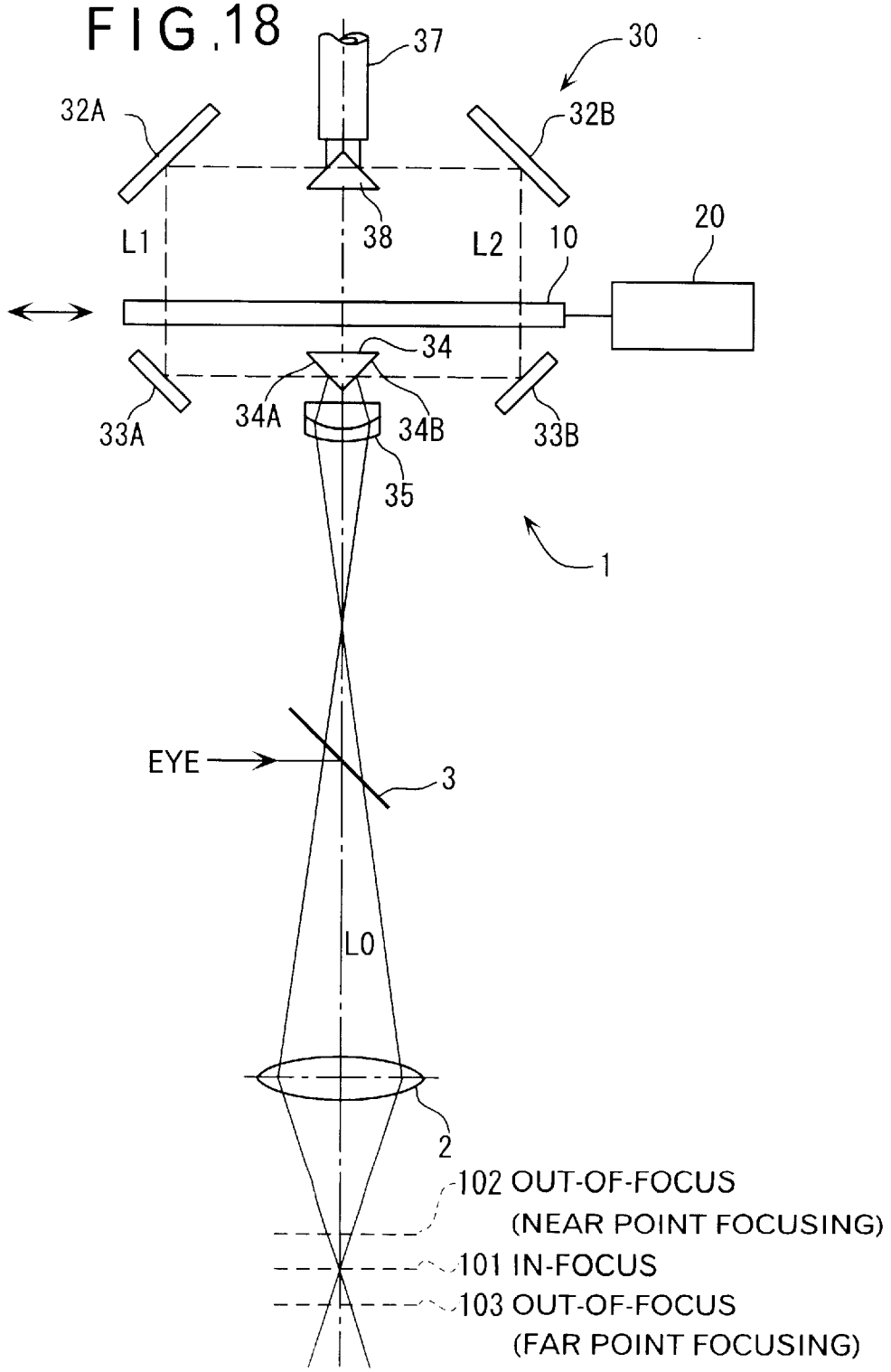
FIG. 18 is an illustration showing other embodiment of a microscope having the focus detection unit according to the present invention.
Figure 19:
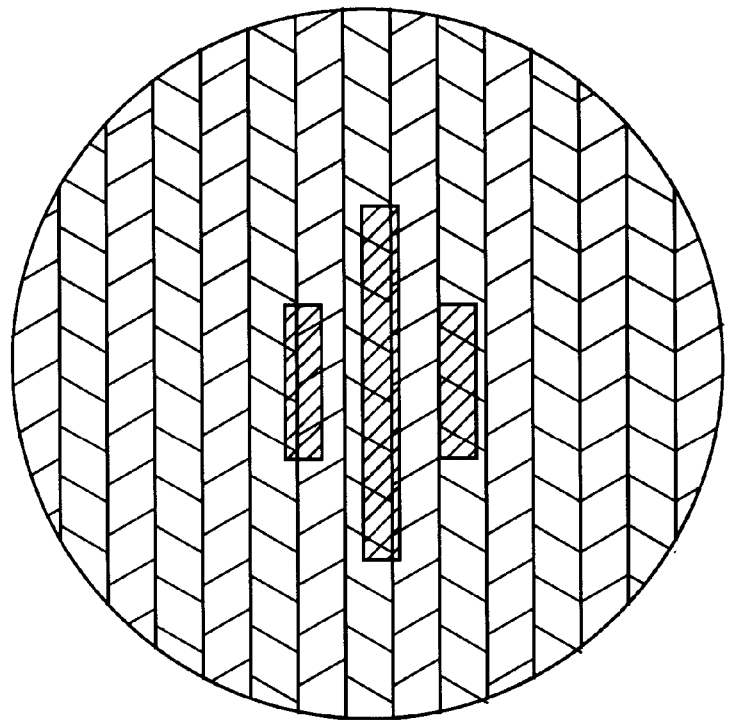
FIG. 19 is an illustration showing a disadvantage in a conventional focus detection unit.
Figure 19:
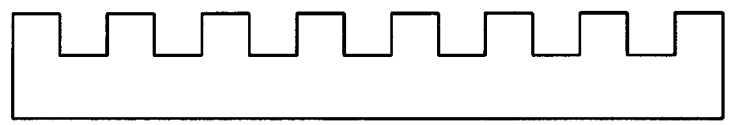

For instance, as shown in FIG. 18, the projector may have an optical fiber 37, a prism 38 disposed at an end of the optical fiber 37, a pair of mirror 32A and 32B for reflecting luminous flux reflected right and left (orthogonally with the optical axis L0) by the prism 38 in a direction parallel to the optical axis L0 to irradiate either one of the first focusing patterns and the second focusing pattern corresponding thereto provided on the slide plate 10, a pair of mirror 33A and 33B for reflecting the luminous flux transmitted through the slide plate 10 to the optical axis L0, a prism 34 disposed on the optical axis L0 between the pair of mirror 33A and 33B for entering the luminous flux reflected by respective mirrors 33A and 33B into a pair of slope 34A and 34B, and a projection lens 35 disposed in front of the prism 34.

Accordingly, since only the optical fiber 37 and the prism 38 are used instead of the lamp 31, thermal influence to the optical system can be reduced while achieving effects similar to the aforesaid embodiment.

What is claimed is:

1. A focus detection unit for focusing by forming images of a first focusing pattern and a second focusing pattern onto an image surface of an optical system, projecting the images onto a workpiece, and adjusting a relative position of the first focusing pattern and the second focusing pattern, comprising:

a focusing pattern forming member having a plurality of pairs of the first focusing pattern and the second focusing pattern;

a switching member for switching the focusing pattern forming member so that the images of either one of the pairs of the first and second focusing patterns on the focusing pattern forming member are projected onto the workpiece; and a projector for projecting the images of the focusing patterns switched by the switching member onto the workpiece.

2. The focus detection unit according to claim 1, wherein the first focusing pattern includes first circular band pattern and the second focusing pattern includes second focusing pattern concentric with the first circular band pattern and having different distance from a center of the first circular band pattern.

3. The focus detection unit according to claim 1, wherein the first focusing pattern includes first semi-circular band pattern and the second focusing pattern includes second semi-circular band pattern line-symmetrical with the first semi-circular pattern.

4. The focus detection unit according to claim 1, wherein the first focusing pattern includes first lined triangle pattern having a plurality of lined triangle and the second focusing pattern includes at least two second lined triangle patterns sandwiching the first lined triangle pattern.

5. The focus detection unit according to claim 1, wherein the first focusing pattern includes a large rhomboid pattern having a plurality of rhomboid section thereinside and the second focusing pattern includes a plurality of small rhomboid pattern to be disposed in the rhomboid sections of the large rhomboid pattern.

6. The focus detection unit according to claim 1, wherein the first focusing pattern and the second focusing pattern are configured so that illuminated portions thereof coincide with each other in in-focus state, and wherein the illuminated portions of both of the focusing patterns are illuminated by colors to be complementary with each other.

7. The focus detection unit according to claim 1, the projector further comprising: a light source disposed on an optical axis; a first pair of mirror for reflecting luminous flux orthogonally irradiated by the light source toward the optical axis to irradiate onto either one of the first focusing patterns and the second focusing pattern corresponding thereto provided on the focusing pattern forming member; a second pair of mirror for reflecting the luminous flux transmitted through the focusing pattern forming member toward the optical axis; a prism disposed on the optical axis between the second pair of mirror for entering the luminous flux reflected by respective mirrors into a pair of slope; and a projection lens disposed in front of the prism.

8. The focus detection unit according to claim 1, the projector further comprising: an optical fiber disposed on an optical axis; a first prism disposed on an end of the optical fiber; a first pair of mirror for reflecting luminous flux orthogonally reflected by the first prism toward the optical axis to irradiate onto either one of the first focusing patterns and the second focusing pattern corresponding thereto provided on the focusing pattern forming member; a second pair of mirror for reflecting the luminous flux transmitted through the focusing pattern forming member toward the optical axis; a second prism disposed on the optical axis between the second pair of mirror for entering the luminous flux reflected by respective mirrors into a pair of slope; and a projection lens disposed in front of the second prism.

9. An optical measuring instrument having a focus detection unit for focusing by forming images of a first focusing pattern and a second focusing pattern onto an image surface of an optical system, projecting the images onto a workpiece, and adjusting a relative position of the first focusing pattern and the second focusing pattern, the focus detection unit comprising:

- a focusing pattern forming member having a plurality of pairs of the first focusing pattern and the second focusing pattern;
- a switching member for switching the focusing pattern forming member so that the images of either one of the pairs of the first and second focusing patterns on the focusing pattern forming member are projected onto the workpiece; and
- a projector for projecting the images of the focusing patterns switched by the switching member onto the workpiece,
- the optical measuring instrument comprising an objective for forming the image projected by the projector onto the workpiece.

10. The optical measuring instrument according to claim 9, wherein the first focusing pattern includes first circular band pattern and the second focusing pattern includes second focusing pattern concentric with the first circular band pattern and having different distance from a center of the first circular band pattern.

11. The optical measuring instrument according to claim 9, wherein the first focusing pattern includes first semi-circular band pattern and the second focusing pattern includes second semi-circular band pattern line-symmetrical with the first semi-circular pattern.

12. The optical measuring instrument according to claim 9, wherein the first focusing pattern includes first lined triangle pattern having a plurality of lined triangle and the second focusing pattern includes at least two second lined triangle patterns sandwiching the first lined triangle pattern.

13. The optical measuring instrument according to claim 9, wherein the first focusing pattern includes a large rhomboid pattern having a plurality of rhomboid section thereinside and the second focusing pattern includes a plurality of small rhomboid pattern to be disposed in the rhomboid sections of the large rhomboid pattern.

14. The optical measuring instrument according to claim 9, wherein the first focusing pattern and the second focusing pattern are configured so that illuminated portions thereof coincide with each other in in-focus state, and wherein the illuminated portions of both of the focusing patterns are illuminated by colors to be complementary with each other.

15. The optical measuring instrument according to claim 9, the projector further comprising: a light source disposed on an optical axis; a first pair of mirror for reflecting luminous flux orthogonally irradiated by the light source toward the optical axis to irradiate onto either one of the first focusing patterns and the second focusing pattern corresponding thereto provided on the focusing pattern forming member; a second pair of mirror for reflecting the luminous flux transmitted through the focusing pattern forming member toward the optical axis; a prism disposed on the optical axis between the second pair of mirror for entering the luminous flux reflected by respective mirrors into a pair of slope; and a projection lens disposed in front of the prism.

16. The optical measuring instrument according to claim 9, the projector further comprising: an optical fiber disposed on an optical axis; a first prism disposed on an end of the optical fiber; a first pair of mirror for reflecting luminous flux orthogonally reflected by the first prism toward the optical axis to irradiate onto either one of the first focusing patterns and the second focusing pattern corresponding thereto provided on the focusing pattern forming member; a second pair of mirror for reflecting the luminous flux transmitted through the focusing pattern forming member toward the optical axis; a second prism disposed on the optical axis between the second pair of mirror for entering the luminous flux reflected by respective mirrors into a pair of slope; and a projection lens disposed in front of the second prism.

* * * * *